United States Patent [19]

Doutt

[11] Patent Number: 4,511,276

[45] Date of Patent: Apr. 16, 1985

[54] CYLINDER PISTON ROD COUPLER

[76] Inventor: Kingsley A. Doutt, P.O. Box 888, Alpena, Mich. 49707

[21] Appl. No.: 491,525

[22] Filed: May 4, 1983

[51] Int. Cl.³ ............................................. F16C 11/06
[52] U.S. Cl. ....................................... 403/77; 403/135
[58] Field of Search ...................... 403/90, 77, 76, 137, 403/135, 140, 125, 126, 122, 134; 464/133, 150, 153, 106, 19

[56] References Cited

U.S. PATENT DOCUMENTS

| 3,329,454 | 7/1967 | Melton et al. | 403/130 X |
| 3,370,860 | 2/1968 | Hohwart et al. | 403/76 X |
| 3,406,992 | 10/1968 | Grotness | 403/77 X |
| 3,408,124 | 10/1968 | Melton et al. | 403/130 X |
| 3,414,302 | 12/1968 | Priest | 403/125 |
| 3,501,180 | 3/1970 | Waara | 403/77 |
| 4,203,683 | 5/1980 | Rogers | 403/135 X |

FOREIGN PATENT DOCUMENTS

| 901628 | 11/1944 | France | 403/122 |
| 844839 | 8/1960 | United Kingdom | 403/130 |
| 2077347 | 12/1981 | United Kingdom | 403/130 |

Primary Examiner—Andrew V. Kundrat
Attorney, Agent, or Firm—Harpman & Harpman

[57] ABSTRACT

A cylinder piston rod coupler for misaligned shafts attaches one shaft to a housing and an annular flange on a stud attached to the other shaft is positioned in the housing between a pair of guide members. A retaining ring in the housing holds the guide members and stud in movable relation and a floating seal closes the housing about the stud and retaining ring. The guide members and the stud are impregnated with TEFLON so as to form slippery surfaces thereon.

3 Claims, 2 Drawing Figures

CYLINDER PISTON ROD COUPLER

BACKGROUND OF THE INVENTION

1. Field of the Invention

This invention relates to couplings for misaligned reciprocating shafts found in connecting the piston rod of a hydraulic piston and cylinder assembly to a work piece moved thereby.

2. Description of the Prior Art

Prior art devices have used a number of different structures. See for example U.S. Pat. Nos. 3,414,302, 3,406,992 and 4,203,683.

In U.S. Pat. No. 3,414,302, a coupling has a housing with a large opening in each end, a stud with a threaded socket in a curved end extends through one chamber and through an exposed opening in a retainer ring, a flanged fitting extends through the other exposed opening.

In U.S. Pat. No. 3,406,992, a housing with chamber in its ends receives a fitting closing one circular chamber and a stud with an annular flange is positioned through the other opening which is exposed.

U.S. Pat. No. 4,203,683 discloses substantially the same open structure about a ball end on a stud. The structures of these patents permit ready contamination of the areas in the couplings through the exposed openings and the couplings have a very short life due to rapid wear.

The present invention seals the openings in the coupling and thus prevents wear due to foreign material and additionally coats the wear surfaces with a slippery material by impregnation.

Applicant's invention allows for coupling misaligned shafts by positioning a concave annular flange ended stud on one shaft between a pair of guide elements. A movable seal encircles the stud maintaining the interior integrity of the coupling. The guide elements are in a housing to which the other shaft is attached. No contaminates can enter the housing.

SUMMARY OF THE INVENTION

A cylinder piston rod coupler for misaligned shafts that allows a wide range of movement between misaligned shafts by utilizing guide elements positioned in a housing and between which a concave annular flanged end of a threaded stud is positioned and attached to the other shaft. The guide elements are secured within the housing by a retainer ring with a movable resilient sealing gland around the stud. The retainer ring threadably engages an opening in said housing.

DESCRIPTION OF THE PREFERRED EMBODIMENT

Figure 1:
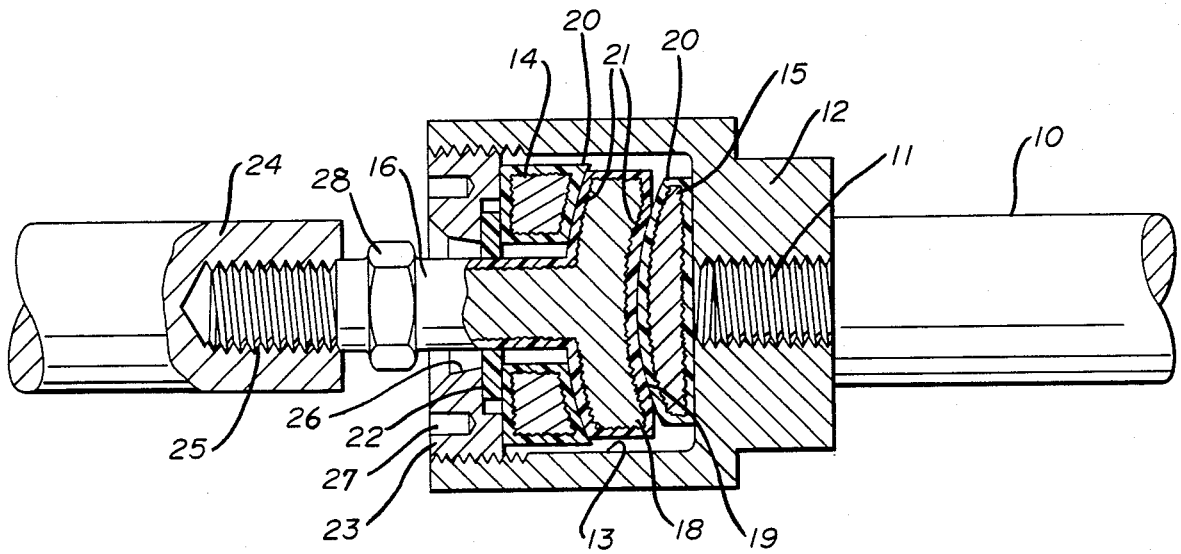
FIG. 1 is a side elevational view of the cylinder and piston rod coupler with parts in cross section.

A cylinder piston rod coupler for misaligned shafts can be seen in FIG. 1 of the drawings receiving a piston rod 10 having a threaded end portion 11 engaged in a wall of an annular housing 12 which defines a circular opening 13 in the opposite end thereof. A pair of oppositely disposed annular guide members 14 and 15 are positioned within the circular opening 13 and are of a diameter less than that of said opening 13.

A stud 16 has an enlarged curved annular flanged end 18 with a concave end 19 which is positioned within the circular chamber 13 between the guide members 14 and 15 with the stud 16 extending outwardly therefrom.

The opposed inner surfaces of the guide members 14 and 15 are of matching radii conforming to that of the radius of the curved annular flanged end 18 of the stud 16 and are impregnated with TEFLON to form slippery surface coatings 20. The opposite outer surfaces 21 of the flanged end 18 of the stud 16 are impregnated with TEFLON and engage the similarly treated surfaces of the guide members 14 and 15. A transversely movable sealing gland 22 is positioned around the stud 16 and against the guide member 14 effectively sealing the area around the stud 16. A retaining ring 23 is threadably secured in the annular housing 12 engaging one of the guide members 14 and the sealing gland 22 so as to hold the stud 16 and the sealing gland 33 in movable relation to the circular chamber 13. The retaining ring 23 has a first annular surface on one side and a second annular surface on the same side spaced radially and sidewardly from the first annular surface. The second annular surface engages the guide member 14 and the first annular surface engages the transversely movable sealing gland 22.

A shaft 24 has an internally threaded opening 25 in an end thereof to threadably receive and hold the stud 16 which has a conforming thread pattern on the end adjacent thereto.

The retaining ring 23 has an interior annular wall 26 defining the opening therein and is beveled inwardly so that the outer diameter of the opening is of a greater diameter than the inner diameter to permit a greater degree of movement of the stud 16 when compensating for the lack of alignment between the piston rod 10 and the shaft 24.

As can be seen in FIG. 1 of the drawings, the piston rod 10 and the shaft 24 are in generally end to end axial alignment with each other in the coupling which is then fastened together by the rotation of the clamping ring 23 by tool receiving openings 27 as will be understood by those skilled in the art.

Figure 2:
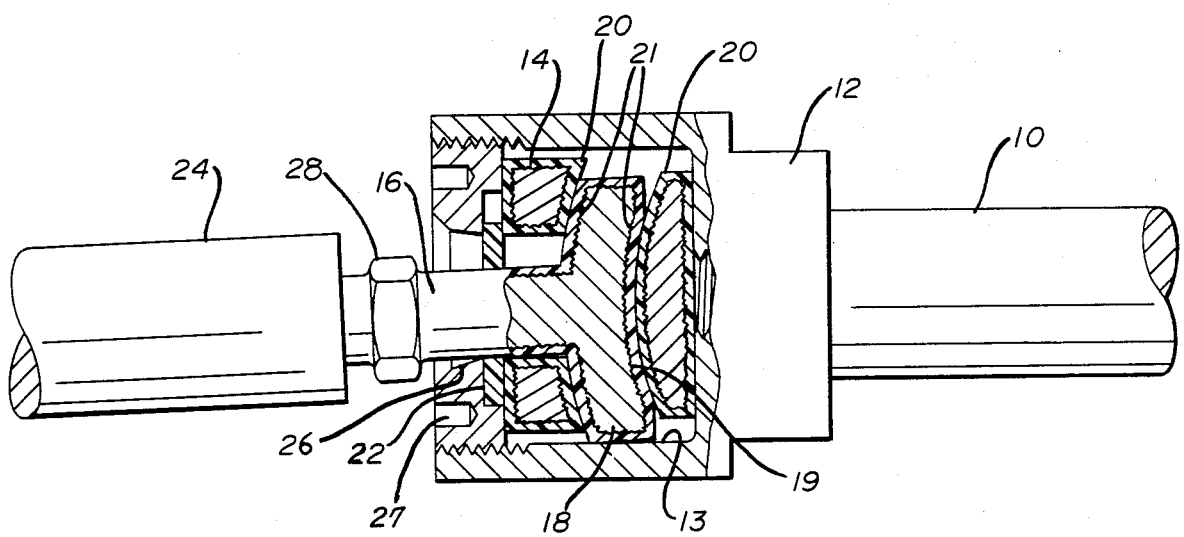
FIG. 2 is a side elevational view with parts in cross section in a misaligned state.

Referring now to FIG. 2 of the drawings, the coupling can be seen with the piston rod 10 and the shaft 24 misaligned wherein the shaft 24 is angularly disposed and offset in relation to the piston rod 10.

It will be seen that the relative spacing of the guide members 14 and 15 in the annular housing 12 allows a great degree of movement of the stud 16 by increasing the angle of declination normally possible in a fixed ball and socket assembly.

A plurality of flat faces 28 circumferentially arranged on the body of the stud 16 are provided to facilitate assembly of the cylinder and piston rod coupler.

It will thus be seen that the cylinder and piston rod coupler provides quick and easy coupling of misaligned shafts to one another and that it is unnecesssary to adjust and reposition the devices to which the shaft and the piston rod are connected.

It will be understood by those skilled in the art that the cylinder piston rod coupler disclosed herein allows for quick and effective coupling of shafts that are disposed in offset endwise relation to one another while also providing coupling of shafts where one is on a horizontal axis and the other is at an angle thereto.

It will be seen that the heretofore rapid wear and short life of the prior art couplings due to infiltration of foreign substances is completely overcome by the novel structure of the movable sealing gland 22 and the engagement of the shaft 10 directly in an end wall of the housing 12 forms a first seal with respect to the circular opening 13 in the housing 12 while the movable resilient sealing gland 22 positioned on the stud 16 and movably sealingly engaged between part of the retaining ring 23 and the guide member 14 forms a second seal so that no foreign substances can enter the coupling thus insuring a long wear free life.

It will also be seen that the novel arrangement, shapes and TEFLON impregnated coating of the guides 13 and 14 and the curved annular flanged end 18 of the stud 16 enable the coupler of the invention to be formed of inexpensive regular steel rather than the expensive heat treated hardened steel required in the prior art devices.

It will thus be seen that a new and novel coupling has been illustrated and described and it will be understood by those skilled in the art that various changes and modifications may be made herein without departing from the spirit of the invention and having thus described my invention, what I claim is:

1. An improvement in a coupling for misaligned shafts having a housing adapted to be attached to one of said shafts and a stud with an enlarged curved end portion attached to the other one of said shafts with the enlarged end portion of the stud movably caged in said housing between guide members therein by a retaining ring, the improvement comprising means for sealing said housing with respect to said other one of said shafts and secondary means forming slippery surfaces on said guide members and on said stud, said housing having a threaded socket in one side wall and an opening oppositely thereto, said guide members in said housing engaging the opposite sides of said enlarged curved end of said stud, said guide members having curved surfaces matching said opposite sides of said enlarged curved end of said stud, a retaining ring engaged in said opening in said housing, one side of said retaining ring having a first annular surface and a second annular surface spaced radially and sidewardly of said first annular surface, said retaining ring being engaged in said opening with said second annular surface engaging one of said guide members so as to hold said guide members with said curved end of said stud between said guide members, said stud extending through said retaining ring, said means for sealing said housing comprising a resilient sealing gland on said stud spaced with respect to said enlarged curved end of said stud and movably engaged between said first annular surface of said retaining ring and one of said guide members so as to be movable transversely of said housing with said stud.

2. The improvement in a coupling for misaligned shafts set forth in claim 1 and wherein said secondary means comprises a TEFLON coating impregnated in said engaging surfaces of said guide members and said enlarged curved end of said stud.

3. The improvement in a coupling for misaligned shafts set forth in claim 1 and wherein said housing is attached to said one shaft by a thread pattern formed on said one shaft and engaged in a threaded secondary opening in said housing in oppositely disposed relation to said opening and retaining ring therein.

* * * * *